(12) United States Patent
Gottschalk et al.

(10) Patent No.: US 10,207,737 B2
(45) Date of Patent: Feb. 19, 2019

(54) FABRICATED STEERING KNUCKLES

(71) Applicant: Hendrickson USA, L.L.C., Itasca, IL (US)

(72) Inventors: Michael J. Gottschalk, McKinney, TX (US); Scott Kohler, Danville, OH (US); Mark Dankow, New Albany, OH (US); Andrew Westnedge, Granville, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 75 days.

(21) Appl. No.: 15/128,769

(22) PCT Filed: Mar. 24, 2015

(86) PCT No.: PCT/US2015/022218
§ 371 (c)(1),
(2) Date: Sep. 23, 2016

(87) PCT Pub. No.: WO2015/148485
PCT Pub. Date: Oct. 1, 2015

(65) Prior Publication Data
US 2017/0174260 A1 Jun. 22, 2017

Related U.S. Application Data

(60) Provisional application No. 61/970,014, filed on Mar. 25, 2014.

(51) Int. Cl.
*B62D 7/16* (2006.01)
*B62D 7/18* (2006.01)
(Continued)

(52) U.S. Cl.
CPC ............... *B62D 7/18* (2013.01); *B62D 7/00* (2013.01); *F16D 51/00* (2013.01);
(Continued)

(58) Field of Classification Search
CPC ......................................................... B62D 7/18
(Continued)

(56) References Cited

U.S. PATENT DOCUMENTS 5,219,176 A * 6/1993 Mitchell .................. B21K 1/74
280/93.512
5,624,011 A 4/1997 White et al.
(Continued)

FOREIGN PATENT DOCUMENTS

CN 201350896 Y 11/2009

OTHER PUBLICATIONS

International Search Report and Written Opinion dated Sep. 21, 2015, for International Application No. PCT/US2015/022218.
(Continued)

*Primary Examiner* — Toan C To
(74) *Attorney, Agent, or Firm* — Cook Alex Ltd.

(57) ABSTRACT

A steering knuckle (18) is provided for use in association with a vehicle steering assembly (10). The steering knuckle (10) includes a knuckle body (20) having a generally vertical face (26) and an upper yolk arm (22) having a generally vertical face (54). The generally vertical faces (26, 54) of the steering knuckle body (20) and the upper yolk arm (22) are connected to each other. The generally vertical face (54) of the upper yolk arm (22) includes a camshaft bore (62) extending therethrough and configured to receive a camshaft (64). The generally vertical face of the knuckle body may be welded to a spindle (24), with a portion of the spindle being cut away to allow for a complete circular weld between the knuckle body and the spindle.

22 Claims, 18 Drawing Sheets

(51) Int. Cl.
   *F16D 51/00* (2006.01)
   *B62D 7/00* (2006.01)
   *F16D 125/30* (2012.01)
   *B60T 1/06* (2006.01)

(52) U.S. Cl.
   CPC ........... *B60G 2200/44* (2013.01); *B60T 1/067* (2013.01); *F16D 2051/003* (2013.01); *F16D 2125/30* (2013.01)

(58) Field of Classification Search
   USPC .................................................. 280/93.512
   See application file for complete search history.

(56) References Cited

U.S. PATENT DOCUMENTS

| | | | | |
|---|---|---|---|---|
| 6,116,626 A * | 9/2000 | Cherry | ................... | B60G 7/001 188/329 |
| 6,398,240 B1 * | 6/2002 | Taylor | ...................... | B60G 3/18 280/93.511 |
| 6,902,176 B2 * | 6/2005 | Gottschalk | ............... | B62D 7/18 280/93.512 |
| 6,974,141 B2 * | 12/2005 | Kim | ...................... | B62D 7/18 280/93.502 |
| 7,419,172 B2 * | 9/2008 | Hsieh | ...................... | B62D 7/18 280/93.51 |
| 8,469,378 B1 * | 6/2013 | Bodary | ................... | B62D 7/18 280/93.512 |
| 8,857,833 B2 * | 10/2014 | Deierling | ................ | B62D 7/18 280/93.512 |
| 9,637,168 B2 * | 5/2017 | Bloink | ...................... | B62D 7/18 |
| 2014/0345994 A1 | 11/2014 | Varela et al. | | |

OTHER PUBLICATIONS

European Patent Office, Office Action, counterpart EP Appl. No. 15718008.4, dated Mar. 5, 2018, 9 pages.

* cited by examiner

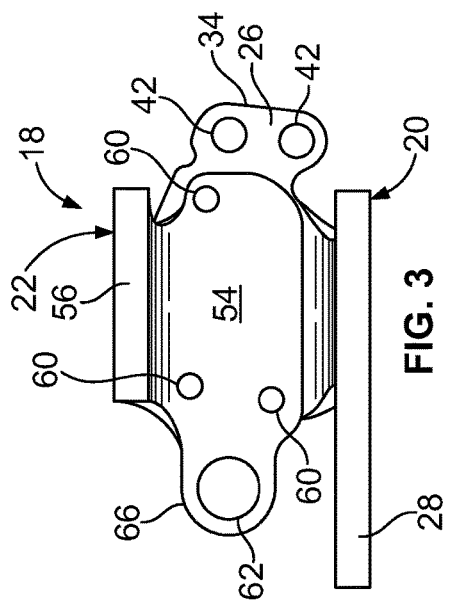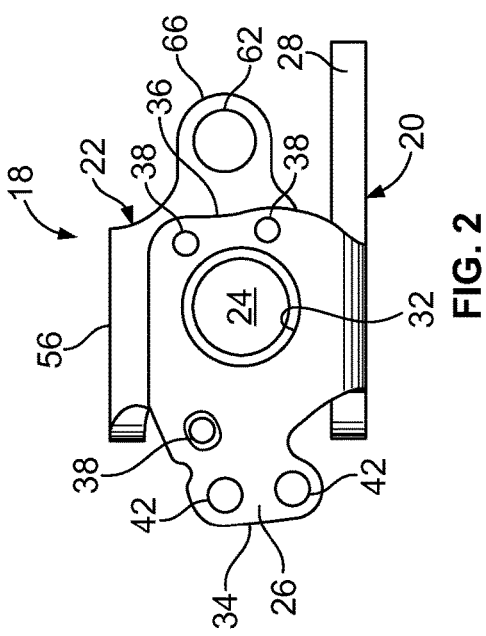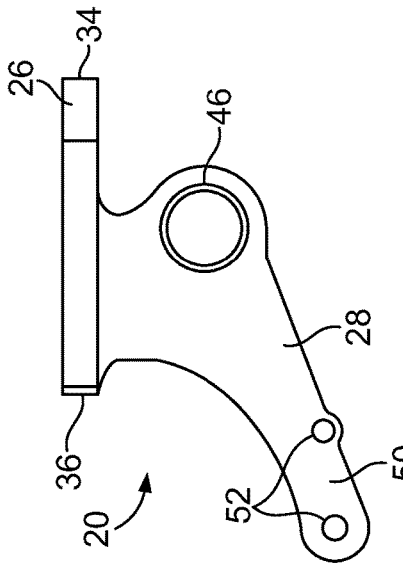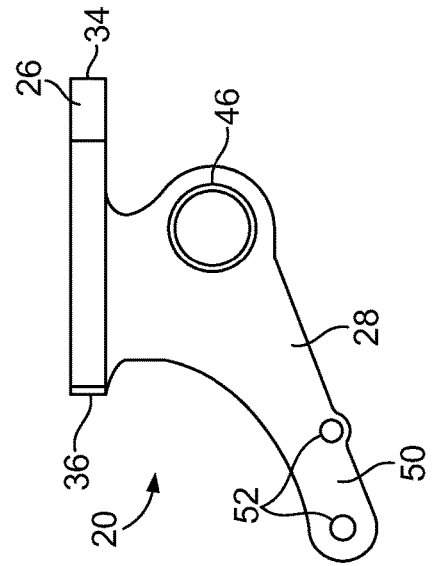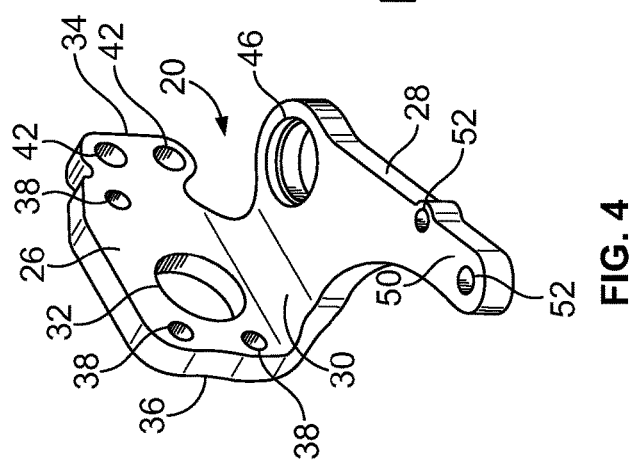
FIG. 2
FIG. 3
FIG. 4
FIG. 5
FIG. 6

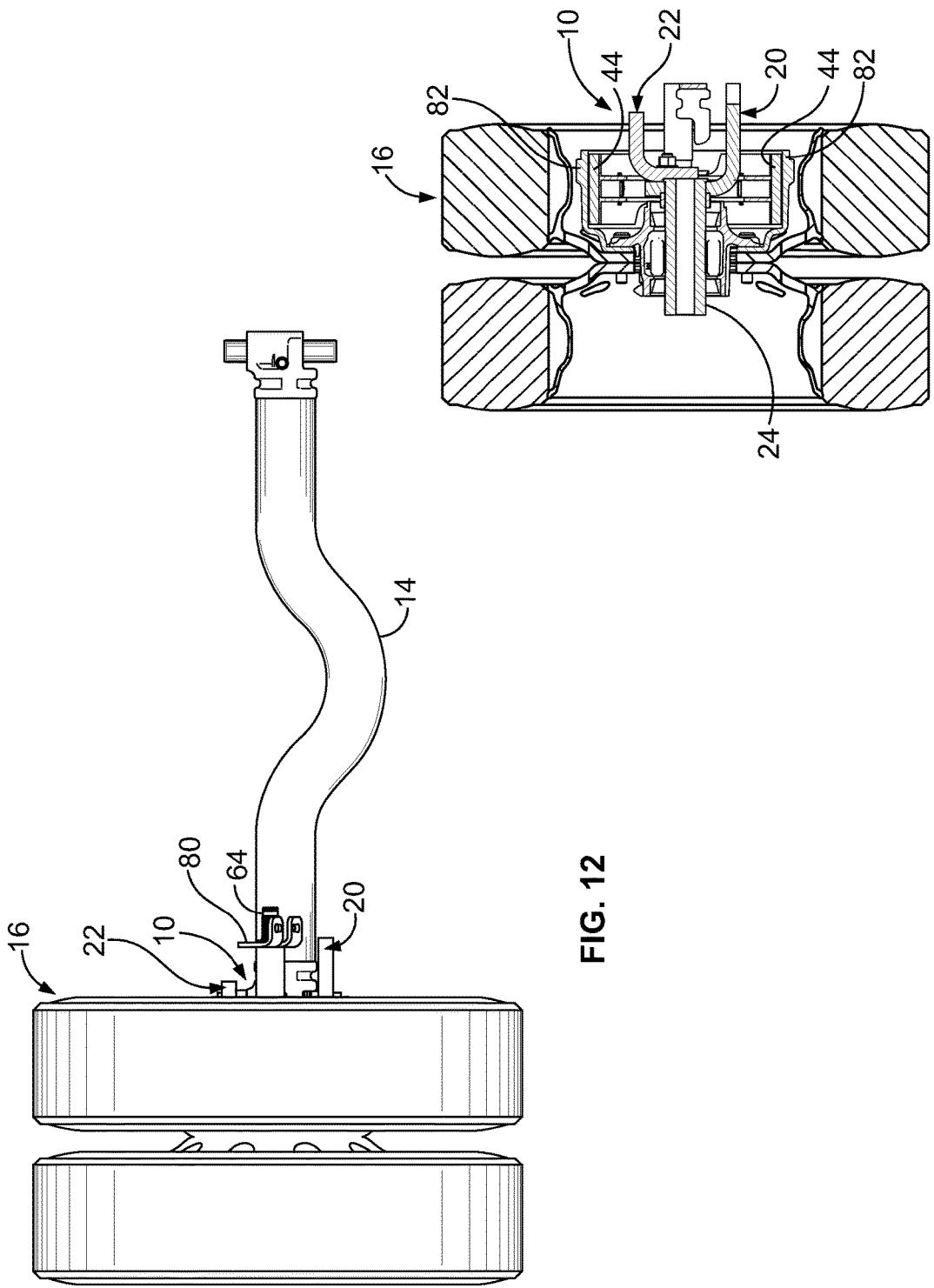

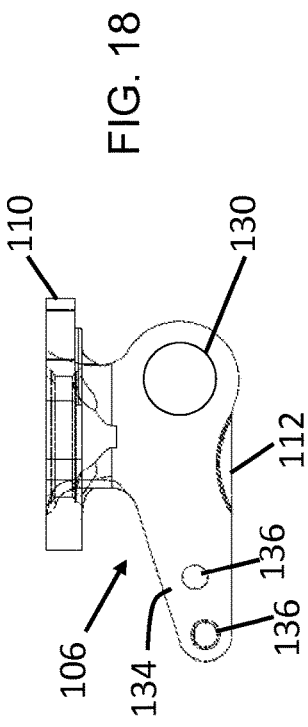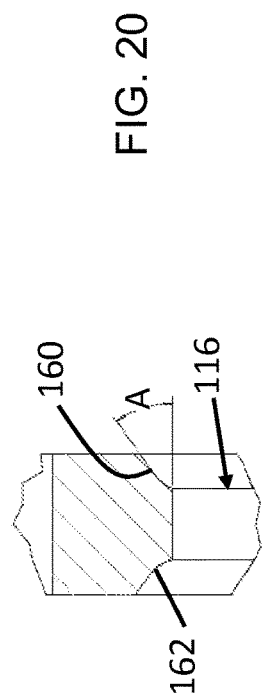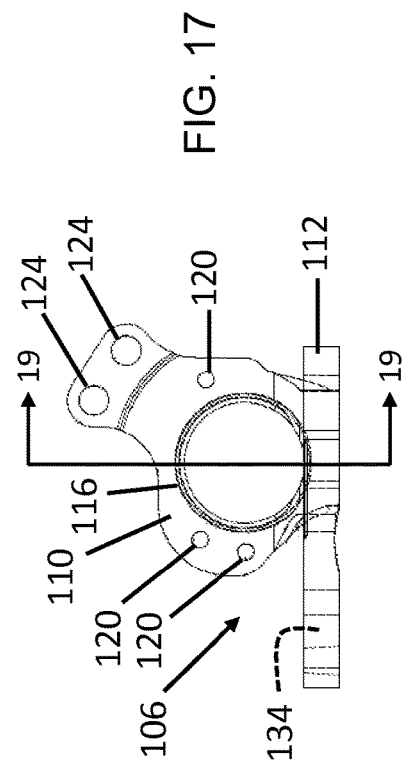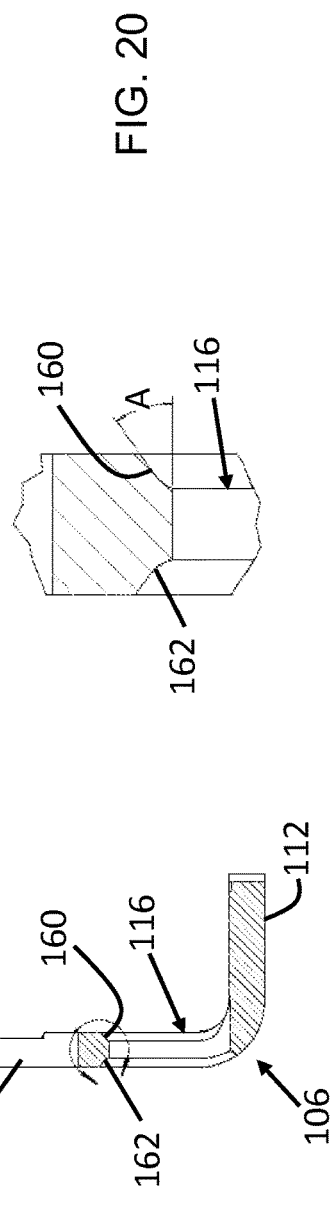

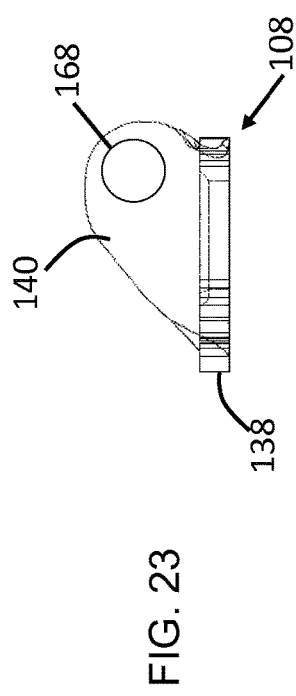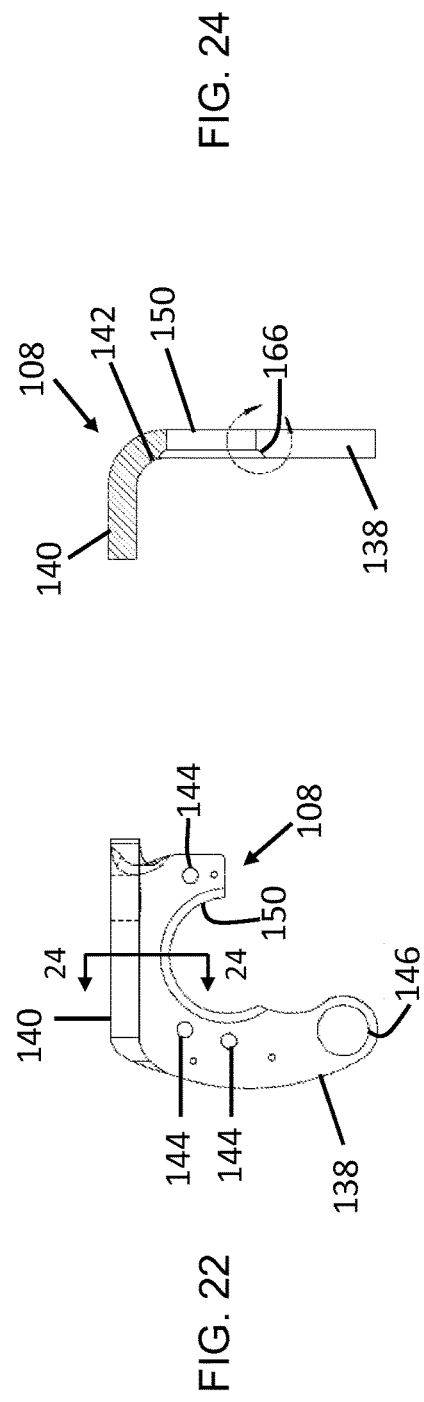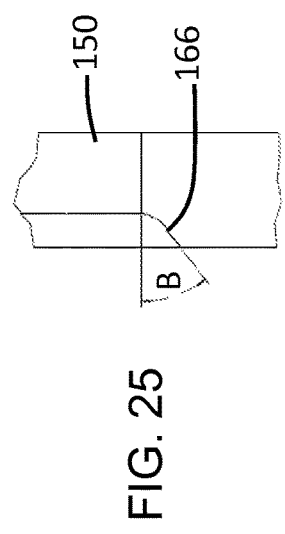

FABRICATED STEERING KNUCKLES

RELATED APPLICATION

This application claims the benefit of and priority of U.S. Provisional Patent Application Ser. No. 61/970,014, filed Mar. 25, 2014, the contents of which are incorporated by reference herein.

BACKGROUND

Field of the Disclosure

The present subject matter relates to steering assemblies for wheeled vehicles. More particularly, the present subject matter relates to multi-piece steering knuckles for steering assemblies of wheeled vehicles.

Description of Related Art

The use of steering knuckles for carrying wheel assemblies is a long-established practice for providing steerability to vehicle axles. Older steering knuckles were commonly single-piece cast items, which were relatively heavy. To lower the weight of the single-piece steering knuckles, fabricated steering knuckles were introduced. Such fabricated steering knuckles were comprised of two or more pieces that were individually formed (e.g., by forging, casting, machining, or the like) and then secured to each other to form the fabricated knuckle. In general, a fabricated steering knuckle may be constructed of upper and lower yoke arms carrying upper and lower bosses (each having an aperture for receipt of a kingpin), as well as having a main body comprised of an integrated or press fit spindle extending centrally therefrom (for mounting a wheel assembly thereon). Examples of such fabricated steering knuckles are described in greater detail in U.S. Pat. No. 6,616,156 to Dudding et al.; U.S. Pat. No. 6,902,176 to Gottschalk; and U.S. Pat. No. 7,530,583 to Gottschalk, all of which are hereby incorporated herein by reference.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately as set forth in the claims appended hereto.

In one aspect, a steering knuckle for use in association with a vehicle steering assembly comprises a knuckle body having a generally vertical face. The steering knuckle also includes an upper yolk arm having a generally vertical face connected to the generally vertical face of the knuckle body. The upper yolk arm includes a camshaft bore extending therethrough and configured to receive a camshaft.

In another aspect, a vehicle steering assembly comprises a knuckle body having a generally vertical face defining a spindle bore. The vehicle steering assembly also includes an upper yolk arm having a generally vertical face connected to the generally vertical face of the knuckle body. A spindle is received by the spindle bore, with the spindle being secured to the spindle bore by at least one circular weld along a perimeter of the spindle.

In yet another aspect, a method for manufacturing a vehicle steering assembly includes providing a knuckle body having a generally vertical face defining a spindle bore. A spindle is positioned within the spindle bore and secured thereto with at least one circular weld along a perimeter of the spindle. A generally vertical face of an upper yolk arm is connected to the generally vertical face of the knuckle body.

BRIEF DESCRIPTION OF THE DRAWINGS

FIG. 2 is a front elevational view of a steering knuckle and spindle of the vehicle steering assembly of FIG. 1;

FIG. 3 is a rear elevational view of the steering knuckle of the vehicle steering assembly of FIG. 1;

FIG. 4 is a rear perspective view of a first piece or knuckle body of the steering knuckle of FIG. 2;

FIG. 5 is a rear elevational view of the first piece or knuckle body of FIG. 4;

FIG. 6 is a top plan view of the first piece or knuckle body of FIG. 4;

FIG. 12 is a rear elevational view of a vehicle axle incorporating the steering assembly of FIG. 9;

FIG. 13 is a cross-sectional view of an end of the vehicle axle of FIG. 12;

FIG. 17 is a rear elevational view of the first piece or knuckle body of FIG. 16;

FIG. 18 is a top plan view of the first piece or knuckle body of FIG. 16;

FIG. 19 is a cross-sectional view of the first piece or knuckle body of FIG. 16, taken through the line 19-19 of FIG. 17;

FIG. 20 is a detail view of a spindle bore of the first piece or knuckle body of FIG. 16;

FIG. 22 is a rear elevational view of the second piece or upper yolk arm of FIG. 21;

FIG. 23 is a bottom plan view of the second piece or upper yolk arm of FIG. 21;

FIG. 24 is a cross-sectional view of the second piece or upper yolk arm of FIG. 21, taken through the line 24-24 of FIG. 22;

FIG. 25 is a detail view of a spindle bore of the second piece or upper yolk arm of FIG. 21;

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

Figure 1:
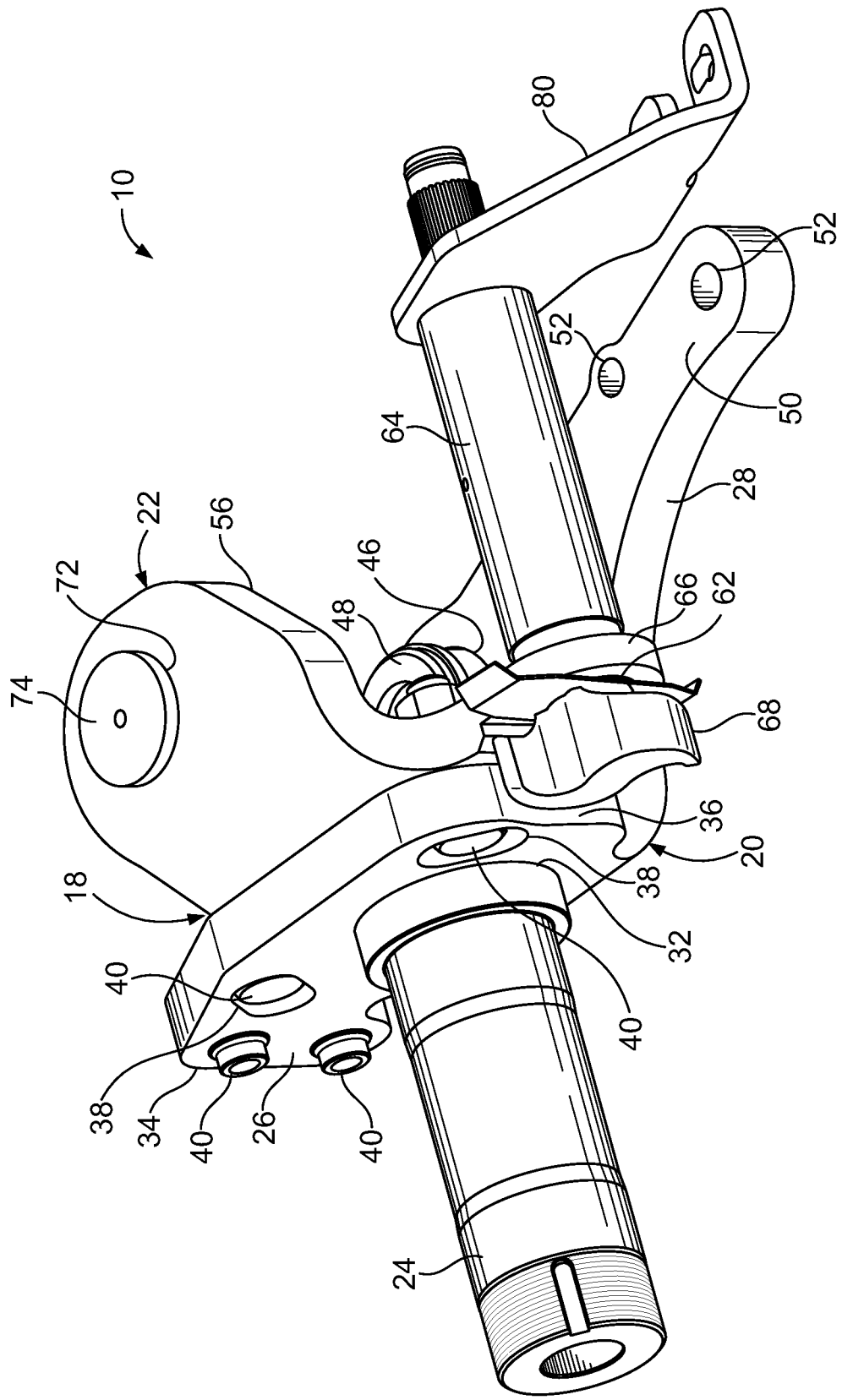
FIG. 1 is a front perspective view of selected components of a vehicle steering assembly according to an aspect of the present disclosure.
Figure 9:
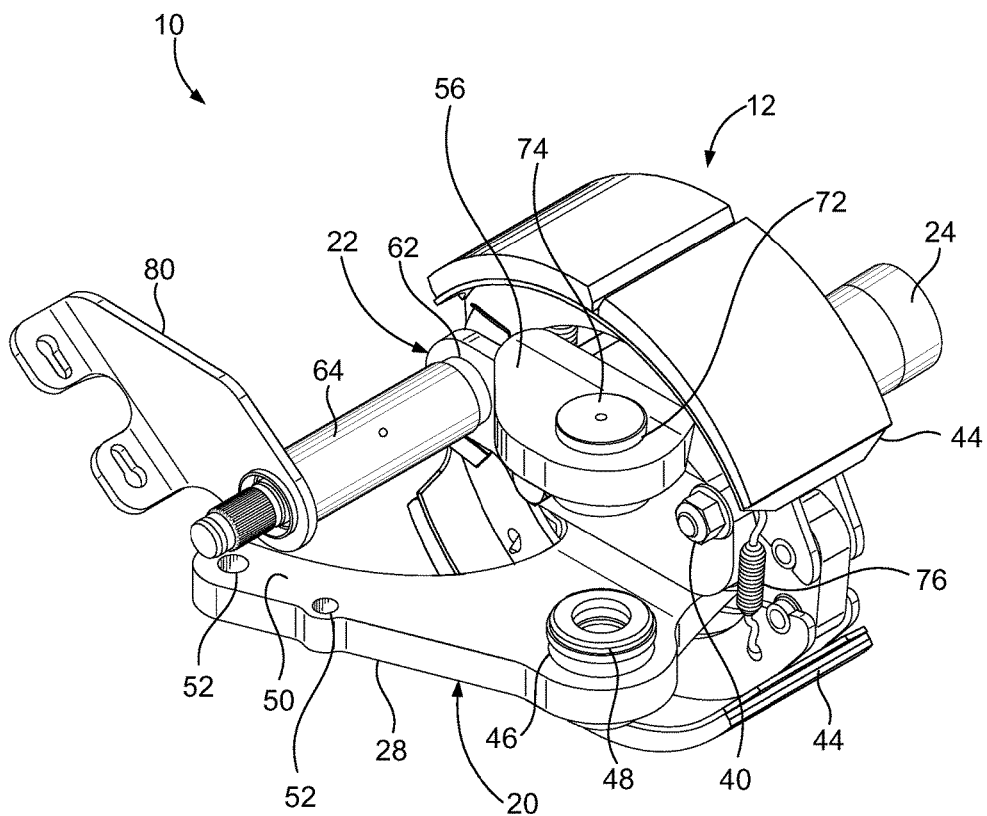
FIG. 9 is a rear perspective view of the steering assembly of FIG. 1, incorporating selected components of a brake assembly.
Figure 10:
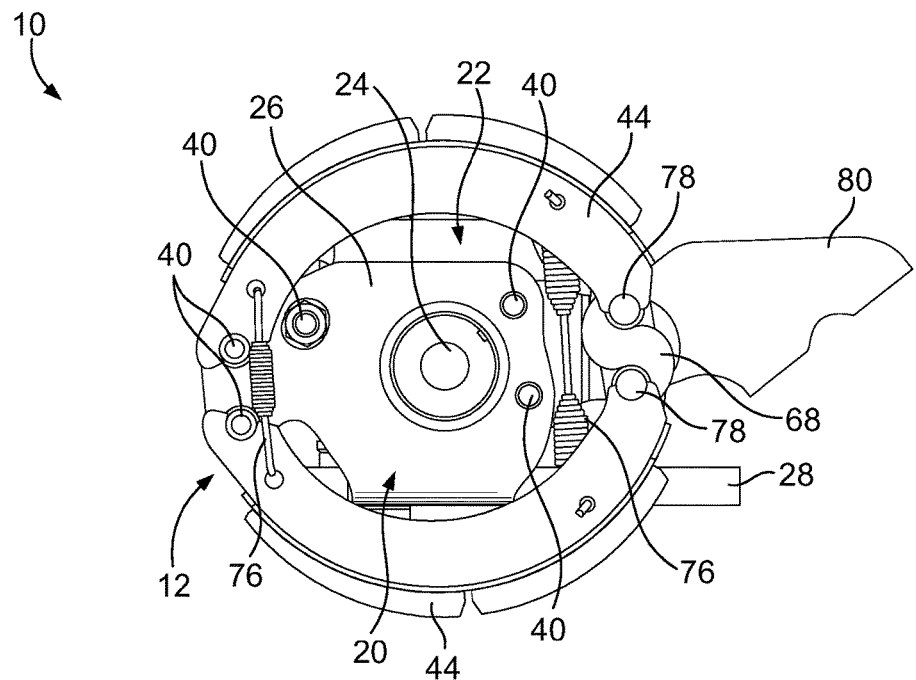
FIG. 10 is a front elevational view of the steering assembly of FIG. 9.
Figure 11:
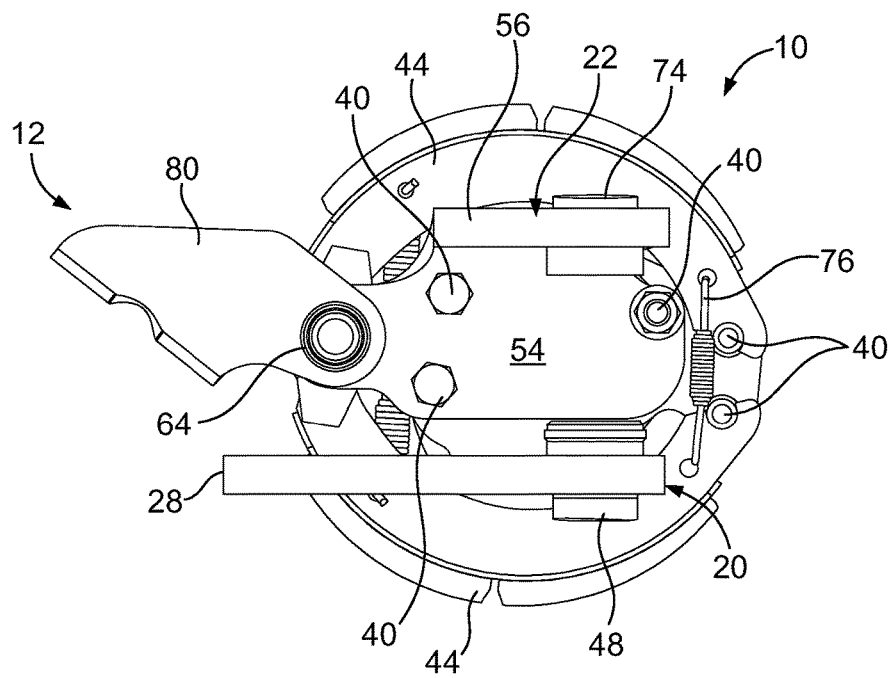
FIG. 11 is a rear elevational view of the steering assembly of FIG. 9.

FIG. 1 shows selected components of a vehicle steering assembly 10 incorporating aspects of the present disclosure. FIGS. 9-11 show a more complete version of the steering assembly 10, with selected components of a brake assembly 12, while FIGS. 12 and 13 show the steering assembly 10 associated with a vehicle axle 14 and a wheel assembly 16.

The steering assembly 10 of FIG. 1 includes a steering knuckle 18 incorporating aspects of the present disclosure. The steering knuckle 18 (FIGS. 2 and 3) is comprised of two pieces or elements or members or plates 20 and 22. The first piece 20 is referred to herein as the knuckle body and the second piece 22 is referred to herein as the upper yolk arm. The knuckle body 20 may alternatively be referred to herein as the lower piece/element/member or the backbone of the steering knuckle 18, while the upper yolk arm 22 may alternatively be referred to herein as the upper piece/element/member/plate. Exemplary embodiments of the two pieces 20 and 22 of the steering knuckle 18 are illustrated in FIGS. 2 and 3 with the other components of the steering assembly 10 (except a spindle 24) omitted for clarity. The knuckle body 20 is shown in greater detail in FIGS. 4-6, with the upper yolk arm 22 being shown in greater detail in FIGS. 7-8.

The knuckle body 20 may include a generally vertical face 26. As used herein, terms of direction (e.g., vertical, horizontal, lateral, and longitudinal) are to be understood with reference to the orientation of the steering assembly 10 (or individual components or portions thereof) when associated with a vehicle axle 14, per conventional design. In the illustrated embodiment, the knuckle body 20 also includes a generally horizontal face or lower yolk arm 28 integrally formed therewith and extending from a lower end of the generally vertical face 26. However, in other embodiments, the lower yolk arm 28 may be separately formed from the generally vertical face 26 of the knuckle body 20. For example, it is within the scope of the present disclosure for the lower yolk arm to be provided as a third separate piece that is secured at or adjacent to a lower portion of the generally vertical face 26 of the knuckle body 20.

If the knuckle body 20 is of the type illustrated in FIGS. 4-6 (i.e., having integrated vertical and horizontal faces), it may be manufactured by cutting or otherwise forming a flat piece of material (e.g., a rectangular strip of metal) to define the appropriate shape, with one shaped portion corresponding to the generally vertical face 26 and another shaped portion corresponding to the lower yolk arm 28. The two portions of the unformed knuckle body 20 are separated by a bend line 30 (FIG. 4). When the unformed knuckle body 20 is bent or otherwise deformed along the bend line 30 to place the knuckle body 20 into a bent or formed configuration (FIGS. 4-6), each of the two shaped portions comes to define one of the faces or sides or surfaces of the formed knuckle body 20. The unformed knuckle body 20 may be bent or deformed to an approximately 90° angle (e.g., in the range of 85-95° in one embodiment) to place it in the formed or bent configuration of FIGS. 4-6.

In the illustrated embodiment, the generally vertical face 26 includes one or more bores extending through it. One of the bores comprises a spindle bore 32 for receiving a spindle 24 (FIGS. 1 and 2). In the illustrated embodiment, the spindle bore 32 is offset from the longitudinal center of the generally vertical face 26 of the knuckle body 20 (i.e., the midpoint between the front edge 34 and the rear edge 36 of the generally vertical face 26 when the steering knuckle 18 is associated with an axle 14, per conventional design), as best illustrated in FIGS. 2 and 5. In other embodiments, the spindle bore 32 may be positioned at or adjacent to the longitudinal center of the generally vertical face 26 of the knuckle body 20. Alternatively, in other embodiments, a spindle may be integrally formed with the knuckle body 20 at the location where the spindle bore 32 would otherwise be.

The illustrated generally vertical face 26 further includes a plurality of fastener bores configured to provide means for connecting the generally vertical face 26 of the knuckle body 20 to other components of the steering assembly 10. For example, selected fastener bores 38 may receive mechanical fasteners or anchor pins 40 to secure the generally vertical face 26 of the knuckle body 20 to the upper yolk arm 22 (FIG. 1). Other fastener bores 42 may receive mechanical fasteners 40 or be otherwise configured for mounting selected components of a brake assembly 12 (a pair of brake shoes 44 in FIGS. 9-11) to the generally vertical face 26 of the knuckle body 20. In other embodiments, there may be a different number of fastener bores and/or the fastener bores may be positioned in different locations. Furthermore, all or selected ones of the illustrated fastener bores may be omitted, with the various components of the steering assembly 10 being connected to the generally vertical face 26 of the knuckle body 20 by other means (e.g., by welding), or may be replaced with different attachment means (e.g., cavities or raised features for press-fitting selected components of the steering assembly 10 to the generally vertical face 26 of the knuckle body 20).

Regardless of whether the lower yolk arm 28 is integrally formed with the generally vertical face 26 of the knuckle body 20 or provided separately, it may be provided with a number of features. In one embodiment, the lower yolk arm 28 includes a lower steering pivot axis bore 46 extending through it. The lower steering pivot axis bore 46 is configured to receive a boss 48 (FIG. 9) which, in turn, receives a bottom end of a kingpin (not illustrated). In the illustrated embodiment, the lower steering pivot axis bore 46 is offset from the spindle bore 32, as best shown in FIG. 5. In other words, the center of the lower steering pivot axis bore 46 is located at a different longitudinal position than the center of the spindle bore 32 when the steering assembly 10 is associated with an axle 14 and in a centered or straight configuration. More particularly, the illustrated steering assembly 10 employs a leading kingpin knuckle design, with the lower steering pivot axis bore 46 configured to be at a longitudinally forward position with respect to the spindle bore 32. In such a configuration, the kingpin received by the lower steering pivot axis bore 46 "leads" (i.e., is positioned longitudinally ahead of) the associated spindle 24 and vehicle axle 14 when the steering assembly 10 is associated with an axle 14.

While the illustrated embodiment employs a leading kingpin knuckle design, other configurations may also be employed without departing from the scope of the present disclosure. For example, the lower yolk arm 28 may be configured to place the lower steering pivot axis bore 46 substantially in line with the spindle bore 32, such that the spindle 24, kingpin, and vehicle axle 14 are at the same approximate longitudinal position when the steering assembly 10 is associated with the axle 14.

The lower yolk arm 28 may also be provided with a tie rod arm 50 having one or more fastener bores 52 configured to connecting the end of a tie rod (not illustrated) to the lower yolk arm 28. Alternatively, rather than fastener bores, other means (e.g., one or more cavities or raised features) may be provided for connecting the tie rod arm 50 to the end of a tie rod.

Figure 7:
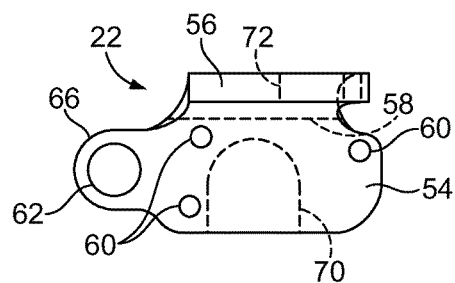
FIG. 7 is a rear elevational view of a second piece or upper yolk arm of the steering knuckle of FIG. 2.
Figure 8:
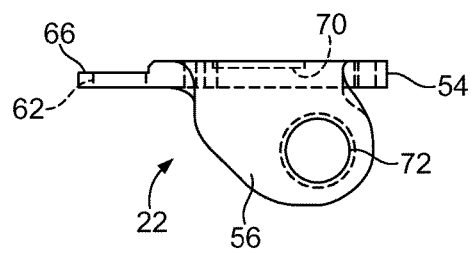
FIG. 8 is a top plan view of the second piece or upper yolk arm of FIG. 7.

Similar to the knuckle body 20, the upper yolk arm 22 may also include a generally vertical face 54. In the illustrated embodiment, the upper yolk arm 22 also includes a generally horizontal face 56 integrally formed therewith and extending from an upper end of the generally vertical face 54. If the upper yolk arm 22 is provided as illustrated in FIGS. 7 and 8 (i.e., having integrated vertical and horizontal faces), it may be manufactured by cutting or otherwise forming a flat piece of material (e.g., a rectangular strip of metal) to define the appropriate shape, with one shaped portion corresponding to the generally vertical face 54 and another shaped portion corresponding to the generally horizontal face 56. The two portions of the unformed upper yolk arm 22 are separated by a bend line 58 (FIG. 7). When the unformed upper yolk arm 22 is bent or otherwise deformed along the bend line 58 to place the upper yolk arm 22 into a bent or formed configuration (FIGS. 7 and 8), each of the two shaped portions comes to define one of the faces or sides or surfaces of the formed upper yolk arm 22. The unformed upper yolk arm 22 may be bent or deformed to an approximately 90° angle (e.g., in the range of 85-95° in one embodiment) to place it in the formed or bent configuration of FIGS. 7 and 8.

In the illustrated embodiment, the generally vertical face 54 includes a plurality of bores extending through it. One or more of the bores may comprise fastener bores 60 configured to provide means for connecting the generally vertical face 54 of the upper yolk arm 22 to the generally vertical face 26 of the knuckle body 20. In such a configuration, the fastener bores 60 of the generally vertical face 54 of the upper yolk arm 22 may be configured to align with corresponding fastener bores 38 of the generally vertical face 26 of the knuckle body 20. Each matched pair of fastener bores 38 and 60 receive a mechanical fastener 40 to secure the generally vertical face 26 of the knuckle body 20 to the upper yolk arm 22 (FIG. 1). In other embodiments, there may be a different number of fastener bores and/or the fastener bores may be positioned in different locations.

Furthermore, all or selected ones of the illustrated fastener bores 60 may be omitted, with the various components of the steering assembly 10 being connected to the generally vertical face 54 of the upper yolk arm 22 by other means (e.g., by welding), or may be replaced with different attachment means (e.g., cavities or raised features for press-fitting selected components of the steering assembly 10 to the generally vertical face 54 of the upper yolk arm 22).

One of the bores comprises a camshaft bore 62 for receiving a camshaft 64 (FIG. 1) of a brake assembly 12. In the illustrated embodiment, the camshaft bore 62 is offset from the portion of the generally vertical face 54 of the upper yolk arm 22 that is connected to the generally vertical face 26 of the knuckle body 20. More particularly, the camshaft bore 62 is defined in a trailing extension 66 of the generally vertical face 54 of the upper yolk arm 22 (i.e., the portion of the generally vertical face 54 of the upper yolk arm 22 connected to the generally vertical face 26 of the knuckle body 20 is configured to be longitudinally forward of the portion 66 of the generally vertical face 54 of the upper yolk arm 22 defining the camshaft bore 62 when the steering knuckle 18 is associated with an axle 14, per conventional design), as best illustrated in FIG. 2.

In one embodiment, the generally vertical face 54 of the upper yolk arm 22 has a varying or non-uniform thickness, with the portion connected to the generally vertical face 26 of the knuckle body 20 having a thickness and the portion directly adjacent to the camshaft bore 62 (e.g., a portion of the extension 66) having a different thickness, as best shown in FIG. 8. The thickness of the portion of the generally vertical face 54 of the upper yolk arm 22 connected to the generally vertical face 26 of the knuckle body 20 may be greater than the thickness of the portion of the generally vertical face 54 of the upper yolk arm 22 directly adjacent to the camshaft bore 62. In one embodiment, the upper yolk arm 22 has a minimum thickness directly adjacent to the camshaft bore 62. It may be advantageous for the thickness of the upper yolk arm 22 to be relatively small directly adjacent to the camshaft bore 62 for improved juxtaposition of selected components of the steering assembly 10 and/or brake assembly 12. In particular, the camshaft 64 of the brake assembly 12 may be provided with an S-cam 68 at one end thereof, with the S-cam 68 positioned laterally outwardly of the generally vertical face 54 of the upper yolk arm 22 (i.e., on the same side of the generally vertical face 54 of the upper yolk arm 22 as the generally vertical face 26 of the knuckle body 20). Selected components of the brake assembly 12 (brake shoes 44 in FIGS. 9-11) may be connected to the outer surface of the generally vertical face 26 of the knuckle body 20. Accordingly, making the portion of the generally vertical face 54 of the upper yolk arm 22 directly adjacent to the camshaft bore 62 relatively thin allows the S-cam 68 to be accommodated without extending past the outer surface of the generally vertical face 26 of the knuckle body 20, thereby avoiding any contact between the S-cam 68 and the brake shoes 44.

In addition to the plurality of bores, the generally vertical face 54 of the upper yolk arm 22 may also be provided with a counterbore 70 (FIG. 7). In the illustrated embodiment, the counterbore 70 is shaped similar to the "key" or free throw lane of a basketball court, which is the composite of a square or rectangle and a semicircle. The counterbore 70 may be variously shaped, most preferably including at least a portion that is generally aligned with (and preferably larger than) the spindle bore 32 of the generally vertical face 26 of the knuckle body 20 when the two pieces 20 and 22 of the steering knuckle 18 are connected.

According to one conventional method of associating a steering knuckle and a spindle, the spindle is pressed into a spindle bore of the steering knuckle in a laterally outward direction. The spindle may include an end flange that is larger than the diameter of the spindle bore to prevent the spindle from passing entirely through the steering knuckle. The illustrated generally vertical face 54 of the upper yolk arm 22 is configured to overlay the spindle bore 32, meaning that the spindle 24 must be moved into the spindle bore 32 prior to connecting the generally vertical faces 26 and 54 of the knuckle body 20 and the upper yolk arm 22 if the spindle 24 is to be pressed into the spindle bore 32 in a laterally outward direction. In such an arrangement, the counterbore 70 accommodates the end flange of the spindle 24. The depth of the counterbore 70 may be substantially equal to the thickness of the end flange of the spindle 24, such that the end flange of the spindle 24 is trapped between the counterbore 70 and the laterally inner surface of the generally vertical face 26 of the knuckle body 20.

If the counterbore is generally circular or otherwise does not extend to an edge of the generally vertical face 54 of the upper yolk arm 22, then the generally vertical face 54 of the upper yolk arm 22 is brought into contact with the generally vertical face 26 of the knuckle body 20 by moving it in a laterally outward direction, with the end flange of the spindle 24 generally aligned with the counterbore. Alternatively, the end flange of the spindle 24 may be seated within the counterbore while moving the generally vertical face 54 of the upper yolk arm 22 into contact with the generally vertical face 26 of the knuckle body 20 in a laterally outward direction.

Otherwise, if the counterbore 70 is configured similar to the embodiment of FIG. 7 (i.e., with the counterbore 70 extending to an edge of the generally vertical face 54 of the upper yolk arm 22), then the generally vertical face 54 of the upper yolk arm 22 may be pressed into contact with the generally vertical face 26 of the knuckle body 20 with the end flange of the spindle 24 positioned outside of the counterbore 70. Thereafter, the generally vertical face 54 of the upper yolk arm 22 may be slid along the generally vertical face 26 of the knuckle body 20 until the end flange of the spindle 24 is received by the counterbore 70. With the end flange of the spindle 24 received by the counterbore 70, the generally vertical face 54 of the upper yolk arm 22 may be slid into full alignment with the generally vertical face 26 of the knuckle body 20 (i.e., with the corresponding fastener bores 38 and 60 aligned, if provided), followed by the knuckle body 20 and the upper yolk arm 22 being secured together.

In other embodiments, the counterbore 70 may be omitted from the generally vertical face 54 of the upper yolk arm 22 or replaced with a spindle bore corresponding to the spindle bore 32 of the knuckle body 20, in which case other appropriate means may be employed for securing the spindle 24 to the steering knuckle 18. In yet another embodiment, a spindle may be integrally formed with the generally vertical face 54 of the upper yolk arm 22 and configured to project through the spindle bore 32 of the knuckle body 20 when the knuckle body 20 and the upper yolk arm 22 are connected to each other.

Turning now to the generally horizontal face 56 of the upper yolk arm 22, it may be provided with a number of features. In one embodiment, the generally horizontal face 56 of the upper yolk arm 22 includes an upper steering pivot axis bore 72 extending through it. Similar to the lower steering pivot axis bore 46 of the lower yolk arm 28, the upper steering pivot axis bore 72 is configured to receive a boss 74 (FIG. 9) which, in turn, receives a top end of a kingpin (not illustrated).

The lower and upper steering pivot axis bores 46 and 72 are generally aligned (FIG. 11) and, in the illustrated embodiment, offset from the spindle bore 32, as described above with reference to the lower steering pivot axis bore 46. Thus, the center of the upper steering pivot axis bore 72 may be located at a different longitudinal position than the center of the spindle bore 32 when the steering assembly 10 is associated with an axle 14 and in a centered or straight configuration. More particularly, the upper steering pivot axis bore 72 may be configured to be at a longitudinally forward position with respect to the spindle bore 32, in which case the kingpin received by the upper steering pivot axis bore 72 "leads" (i.e., is positioned longitudinally ahead of) the associated spindle 24 and vehicle axle 14 when the steering assembly 10 is associated with an axle 14. However, in other embodiments, the generally horizontal face 56 of the upper yolk arm 22 may be configured to place the upper steering pivot axis bore 72 substantially in line with the spindle bore 32, such that the spindle 24, kingpin, and vehicle axle 14 are at the same approximate longitudinal position when the steering assembly 10 is associated with the axle 14.

In addition to the steering knuckle 18, the spindle 24, and the other components described above, the steering assembly 10 may include a plurality of other components. FIGS. 9-11 show the steering assembly 10 of FIG. 1 with additional components of a brake assembly 12. In the illustrated embodiment, the brake assembly 12 includes a pair of brake shoes 44 connected to the generally vertical face 26 of the knuckle body 20. A plurality of springs 76 bias the brake shoes 44 toward each other. Biasing the brake shoes 44 toward each other brings cam followers 78 of the brake shoes 44 into contact with an S-cam 68. The S-cam 68 is connected to an end of a camshaft 64 received by the camshaft bore 62 of the upper yolk arm 22. A lever 80 is rigidly secured at or adjacent to the other end of the camshaft 64 for association with a brake chamber (not illustrated).

When a brake pedal is depressed, air enters the brake chamber and is converted to rotational movement of the lever 80 about the central axis of the camshaft 64. The S-cam 68 rotates with the camshaft 64, thereby adjusting the relative positions of the cam followers 78 and, hence, the brake shoes 44. Causing the cam followers 78 to move apart has the effect of spreading the brake shoes 44 away from each other and into contact with the inner surface of a brake drum 82 (FIG. 13). Bringing the brake shoes 44 into contact with the brake drum 82 slows rotation of the wheel assembly 16 associated with the steering assembly 10.

When pressure is removed from the brake pedal, the camshaft 64 and S-cam 68 are caused to rotate in the opposite direction of their rotation direction when the brake pedal is depressed. This allows the cam followers 78 to move closer together, which moves the brake shoes 44 out of contact with the brake drum 82 and allows for less-constrained rotation of the wheel assembly 16.

Figure 14:
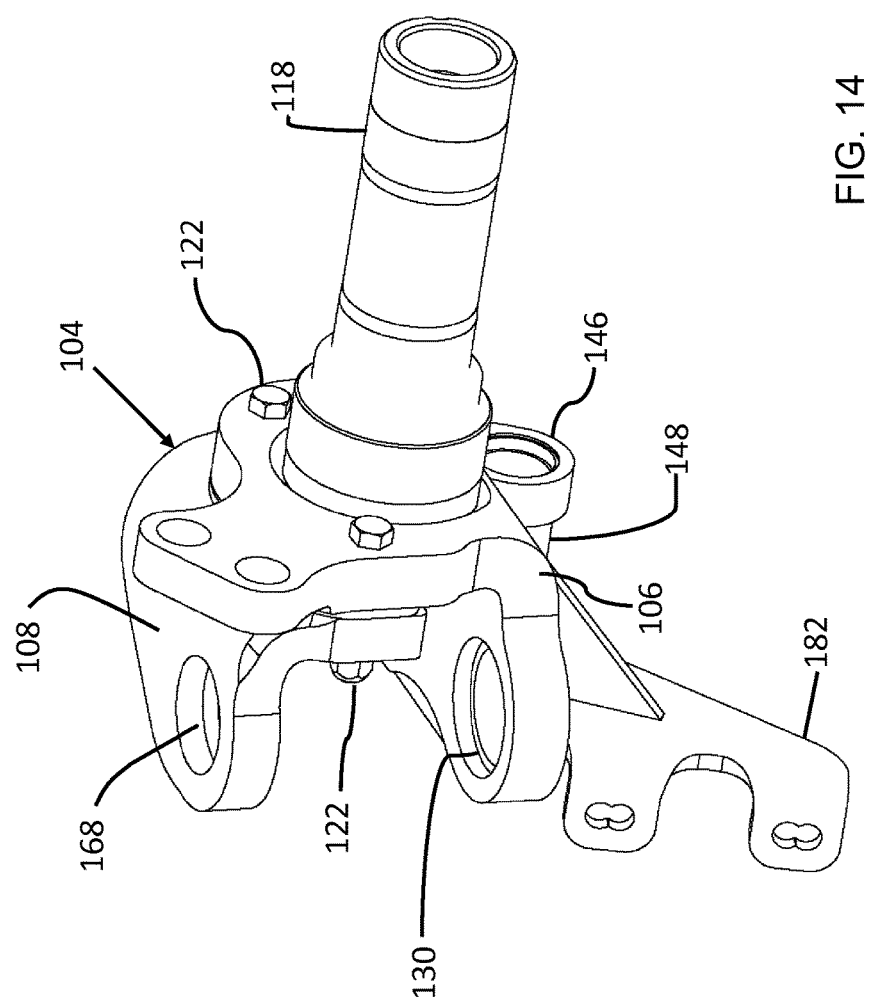
FIG. 14 is a front perspective view of selected components, including a steering knuckle and spindle, of another embodiment of a vehicle steering assembly according to an aspect of the present disclosure.
Figure 15:
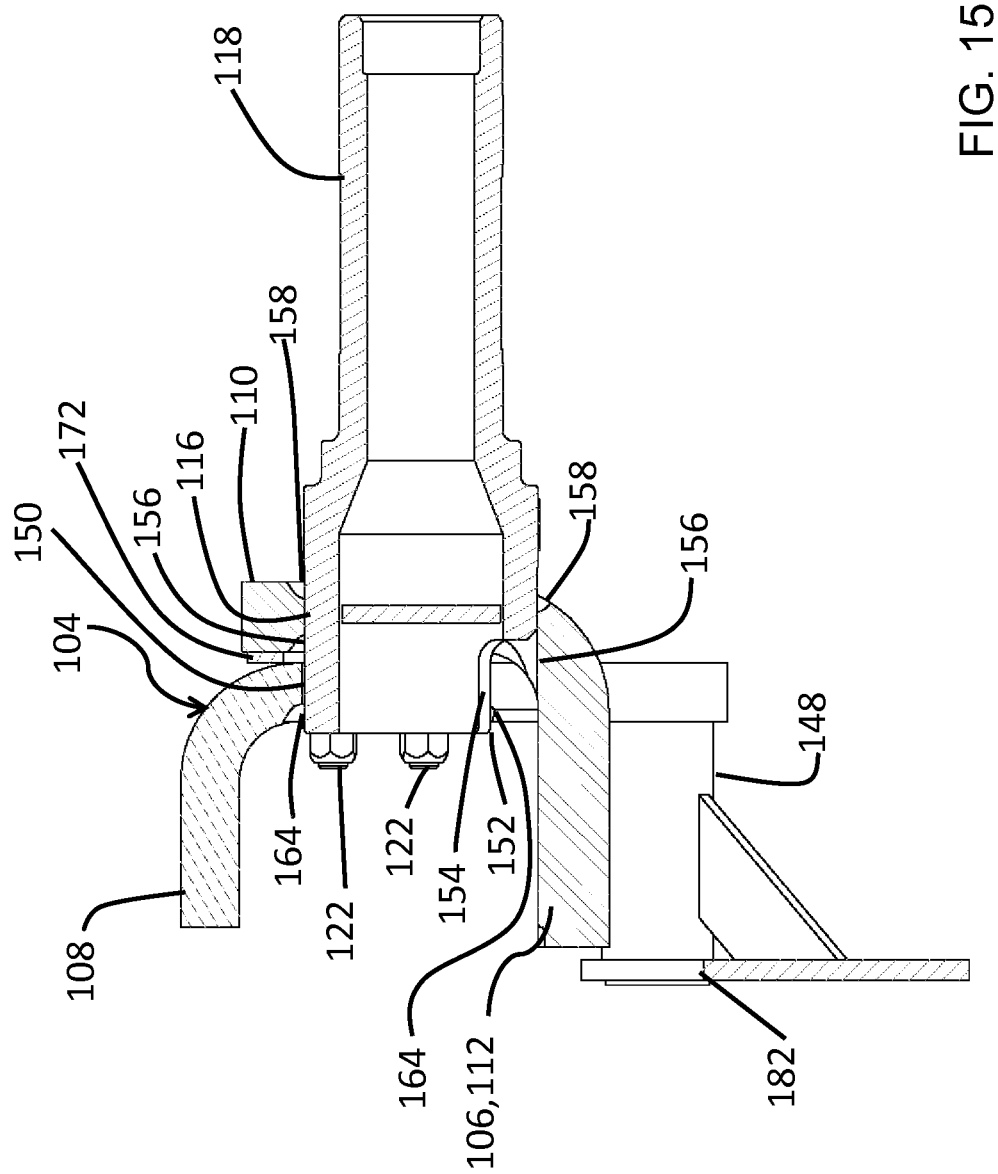
FIG. 15 is a side elevational view of the steering knuckle and spindle of FIG. 14.

FIGS. 14 and 15 show selected components of an alternative embodiment of a vehicle steering assembly 100 incorporating aspects of the present disclosure. FIGS. 16-30 show individual components of the steering assembly 100, while FIGS. 31-35 show a more complete version of the steering assembly 100, with selected components of a brake assembly 102.

The steering assembly 100 of FIGS. 14-35 includes a steering knuckle 104 which is similar to the embodiment of FIGS. 1-13, being comprised of a first piece or knuckle body 106 and a second piece or upper yolk arm 108. The knuckle body 106 is shown in greater detail in FIGS. 16-20, with the upper yolk arm 108 being shown in greater detail in FIGS. 21-25.

The knuckle body 106 includes a generally vertical face 110 and a generally horizontal face or lower yolk arm 112 extending from a lower end of the generally vertical face 110, both of which faces 110 and 112 may be provided generally in accordance with the foregoing description of the embodiment of FIGS. 1-13. In the illustrated embodiment, the faces 110 and 112 are integrally formed with each other but, in other embodiments, the lower yolk arm 112 may be separately formed from the generally vertical face 110. For example, it is within the scope of the present disclosure for the lower yolk arm 112 to be provided as a third separate piece that is secured at or adjacent to a lower portion of the generally vertical face 110 of the knuckle body 106.

The knuckle body 106 of FIGS. 16-20 may be manufactured according to any suitable method, including the method described above with regard to the embodiment of FIGS. 1-13. More particularly, the knuckle body 106 may be manufactured by cutting or otherwise forming a flat piece of material (e.g., a rectangular strip of metal) to define the appropriate shape, with one shaped portion corresponding to the generally vertical face 110 and another shaped portion corresponding to the lower yolk arm 112. The two portions of the unformed knuckle body 106 are separated by a bend line 114 (FIG. 16) about which the unformed knuckle body 106 is bent or otherwise deformed to place the knuckle body 106 into the illustrated bent or formed configuration (FIGS. 16-20). The unformed knuckle body 106 may be bent or deformed to an approximately 90° angle (e.g., in the range of 85-95° in one embodiment) to place it in the formed or bent configuration of FIGS. 16-20.

In the illustrated embodiment, the generally vertical face 110 includes one or more bores extending through it. One of the bores comprises a spindle bore 116 for receiving a spindle 118 (FIGS. 14-15 and 26-28). As in the embodiment of FIGS. 1-13, the spindle bore 116 is illustrated as being offset from the longitudinal center of the generally vertical face 110 of the knuckle body 106, as best illustrated in FIGS. 17 and 18. In other embodiments, the spindle bore 116 may be positioned at or adjacent to the longitudinal center of the generally vertical face 110 of the knuckle body 106. Alternatively, in other embodiments, a spindle may be integrally formed with the knuckle body 106 at the location where the spindle bore 116 would otherwise be.

The illustrated generally vertical face 110 may additionally include a plurality of fastener bores configured to provide means for connecting the generally vertical face 110 of the knuckle body 106 to other components of the steering assembly 100. For example, selected fastener bores 120 may receive mechanical fasteners 122 to secure the generally vertical face 110 of the knuckle body 106 to the upper yolk arm 108 (FIGS. 14-15 and 31-35). Other fastener bores 124 may receive mechanical fasteners or anchor pins 126 or be otherwise configured for mounting selected components of a brake assembly 102 (a pair of brake shoes 128 in FIGS. 31-35) to the generally vertical face 110 of the knuckle body 106. In other embodiments, there may be a different number of fastener bores and/or the fastener bores may be positioned in different locations. Furthermore, all or selected ones of the illustrated fastener bores may be omitted, with the various components of the steering assembly 100 being connected to the generally vertical face 110 of the knuckle body 106 by other means (e.g., by welding), or may be replaced with different attachment means (e.g., cavities or raised features for press-fitting selected components of the steering assembly 100 to the generally vertical face 110 of the knuckle body 106).

Figure 16:
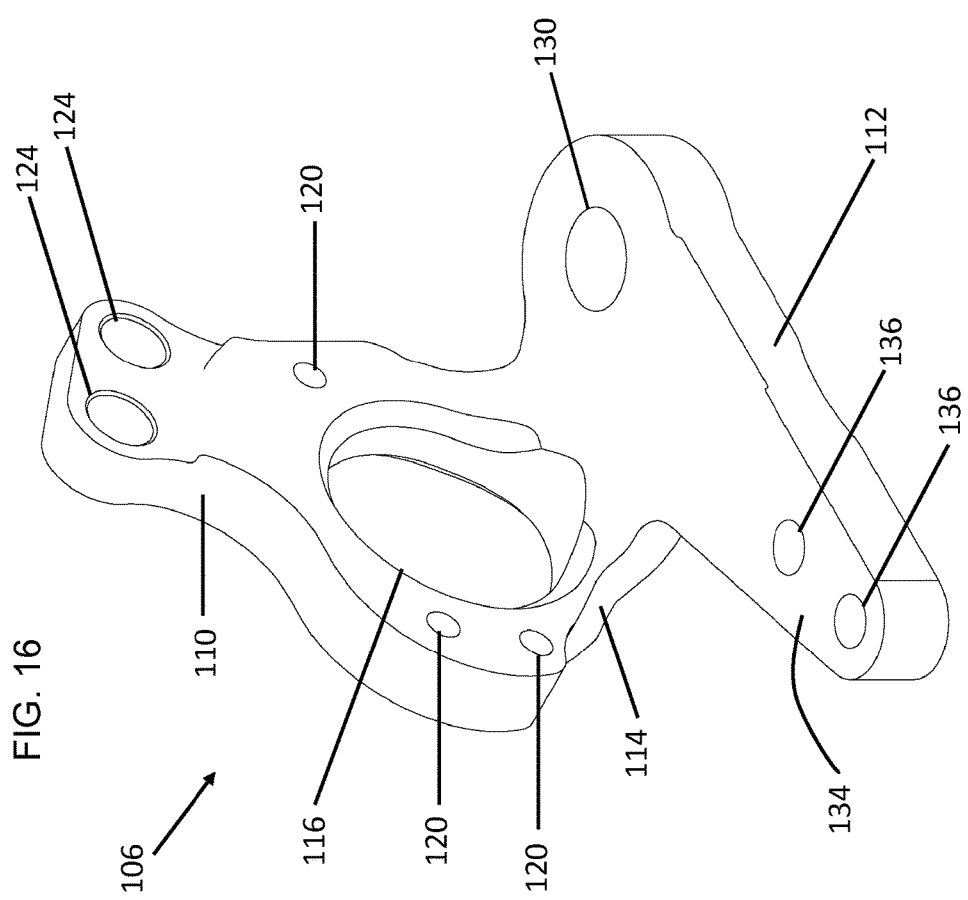
FIG. 16 is a rear perspective view of a first piece or knuckle body of the steering knuckle of FIG. 14.
Figure 21:
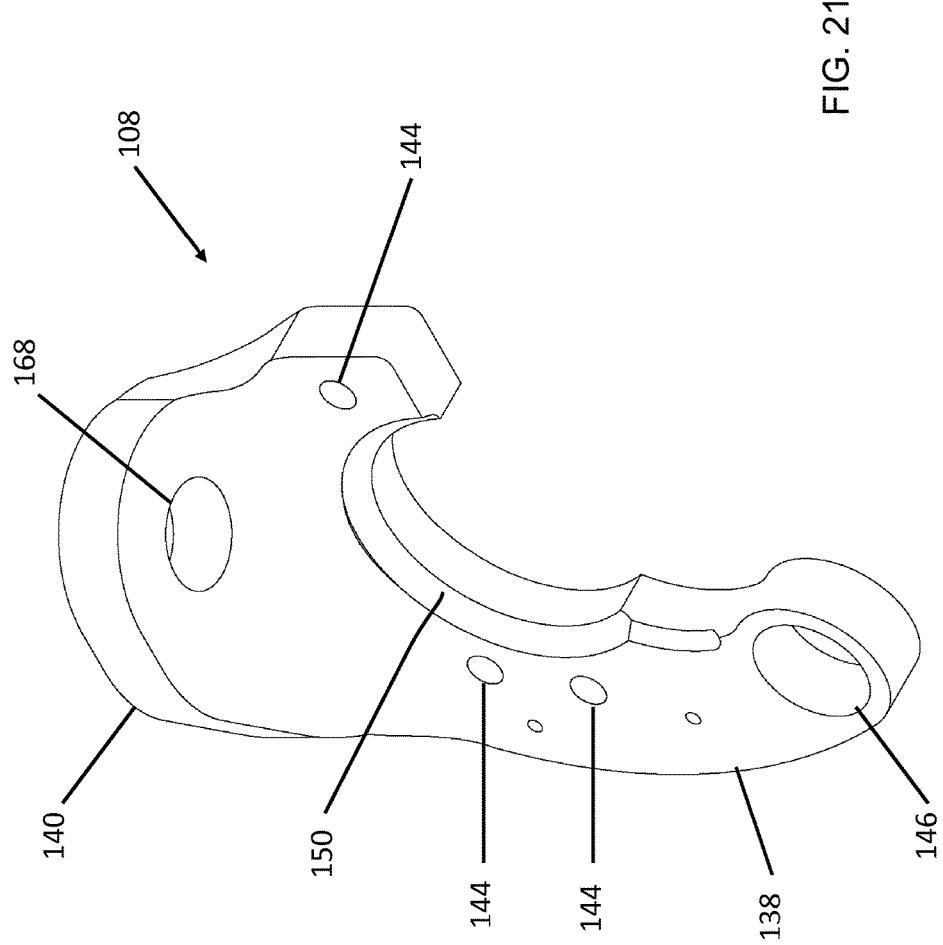
FIG. 21 is a rear perspective view of a second piece or upper yolk arm of the steering knuckle of FIG. 14.

In the illustrated embodiment, the lower yolk arm 112 of the knuckle body 106 includes a lower steering pivot axis bore 130 extending through it. The lower steering pivot axis bore 130 is configured to receive a boss 132 (FIGS. 32-35) which, in turn, receives a bottom end of a kingpin (not illustrated). In the illustrated embodiment, the lower steering pivot axis bore 130 is offset from the spindle bore 116, as best shown in FIG. 16 and in accordance with the leading kingpin knuckle design of FIGS. 1-13. While the illustrated embodiment employs a leading kingpin knuckle design, other configurations may also be employed without departing from the scope of the present disclosure. For example, the lower yolk arm 112 may be configured to place the lower steering pivot axis bore 130 substantially in line with the spindle bore 116, such that the spindle 118, kingpin, and vehicle axle are at the same approximate longitudinal position when the steering assembly 100 is associated with the axle.

As in the embodiment of FIG. 1-13, the lower yolk arm 112 may also be provided with a tie rod arm 134 having one or more fastener bores 136 configured to connecting the end of a tie rod (not illustrated) to the lower yolk arm 112. Alternatively, rather than fastener bores, other means (e.g., one or more cavities or raised features) may be provided for connecting the tie rod arm 134 to the end of a tie rod.

Similar to the knuckle body 106, the upper yolk arm 108 may also include a generally vertical face 138. As in the embodiment of FIGS. 1-13, the illustrated upper yolk arm 108 includes a generally horizontal face 140 integrally formed therewith and extending from an upper end of the generally vertical face 138. If the upper yolk arm 108 is provided as illustrated in FIGS. 21-25 (i.e., having integrated vertical and horizontal faces), it may be manufactured by cutting or otherwise forming a flat piece of material (e.g., a rectangular strip of metal) to define the appropriate shape, with one shaped portion corresponding to the generally vertical face 138 and another shaped portion corresponding to the generally horizontal face 140 separated by a bend line 142 (FIG. 24). When the unformed upper yolk arm 108 is bent or otherwise deformed along the bend line 142 to place the upper yolk arm 108 into a bent or formed configuration (FIGS. 21-25), each of the two shaped portions comes to define one of the faces of the formed upper yolk arm 108. The unformed upper yolk arm 108 may be bent or deformed to an approximately 90° angle (e.g., in the range of 85-95° in one embodiment) to place it in the formed or bent configuration of FIGS. 21-25.

In the illustrated embodiment, the generally vertical face 138 of the upper yolk arm 108 includes a plurality of bores extending through it. One or more of the bores may comprise fastener bores 144 configured to provide means for connecting the generally vertical face 138 of the upper yolk arm 108 to the generally vertical face 110 of the knuckle body 106, in which case the fastener bores 144 of the generally vertical face 138 of the upper yolk arm 108 may be configured to align with corresponding fastener bores 120 of the generally vertical face 110 of the knuckle body 106. Each matched pair of fastener bores 120 and 144 receive a mechanical fastener 122 to secure the generally vertical face 110 of the knuckle body 106 to the upper yolk arm 108 (FIGS. 14-15 and 31-35). In other embodiments, there may be a different number of fastener bores and/or the fastener bores may be positioned in different locations. Furthermore, all or selected ones of the illustrated fastener bores 144 may be omitted, with the various components of the steering assembly 100 being connected to the generally vertical face 138 of the upper yolk arm 108 by other means (e.g., by welding), or may be replaced with different attachment means (e.g., cavities or raised features for press-fitting selected components of the steering assembly 100 to the generally vertical face 138 of the upper yolk arm 108).

One of the bores defined in the generally vertical face 138 of the upper yolk arm 108 comprises a camshaft bore 146 for receiving a camshaft 148 (FIGS. 14 and 15) of a brake assembly 102 (FIG. 31-35). In contrast to the embodiment of FIGS. 1-13, the camshaft bore 146 is generally aligned with the generally vertical face 110 of the knuckle body 106, rather than being positioned behind or offset from the portion of the generally vertical face 26 of the knuckle body 20 that is connected to the generally vertical face 54 of the upper yolk arm 22. Additionally, whereas the camshaft bore 62 of the embodiments of FIGS. 1-13 is positioned above the lower yolk arm 28, the generally vertical face 138 of the upper yolk arm 108 extends downwardly to place the camshaft bore 146 at a lower elevation than the lower yolk arm 112, as best shown in FIG. 15. Furthermore, whereas the portion of the generally vertical face 54 of the upper yolk arm 22 directly adjacent to the camshaft bore 62 of the embodiment of FIGS. 1-13 is thinner than the remainder of the upper yolk arm 22, the portion of the generally vertical face 138 of the upper yolk arm 108 directly adjacent to the camshaft bore 146 of FIGS. 21-25 has a thickness substantially the same as the thickness of the rest of the upper yolk arm 108.

In addition to the plurality of bores, a lower edge or surface of the generally vertical face 138 of the upper yolk arm 108 may be provided with an arcuate formation or contour 150. The lower edge or surface of the generally vertical face 138 of the upper yolk arm 108 is configured such that the arcuate formation 150 will be aligned with the spindle bore 116 of the knuckle body 106 when the upper yolk arm 108 is secured to the knuckle body 106, which allows the associated spindle 118 to extend through both the spindle bore 116 and the arcuate formation 150 (FIG. 15). Preferably, the arcuate formation 150 extends along an arc greater than 180° (e.g., approximately 225°), such that a spindle 118 received within the arcuate formation 150 cannot be separated from the upper yolk arm 108 by movement in a radial direction. This is in contrast to the embodiment of FIGS. 1-13, in which the generally vertical face 54 of the upper yolk arm 22 includes a counterbore 70 for receiving an end flange of a spindle 24.

Figure 27:
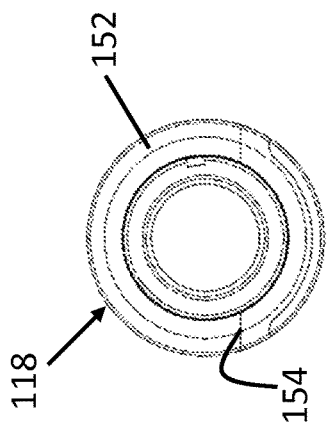
FIG. 27 is a rear elevational view of the spindle of FIG. 14.
Figure 26:
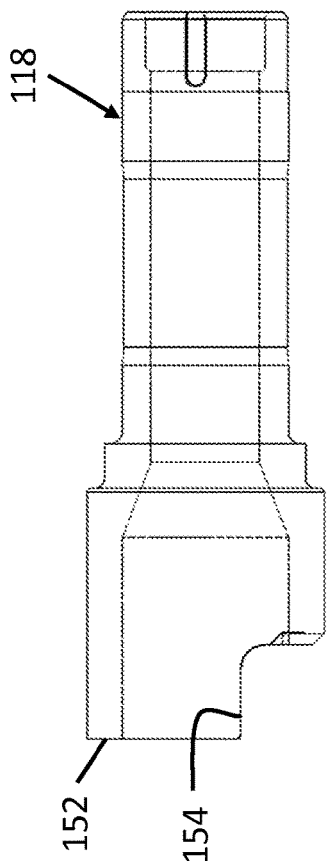
FIG. 26 is a side elevational view of the spindle of FIG. 14.
Figure 28:
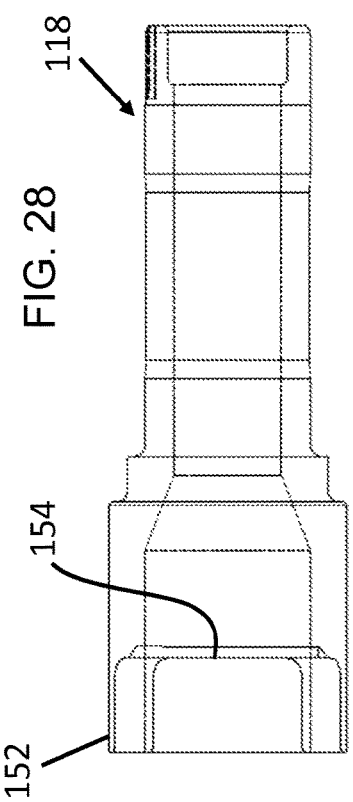
FIG. 28 is a bottom plan view of the spindle of FIG. 14.
Figure 30:
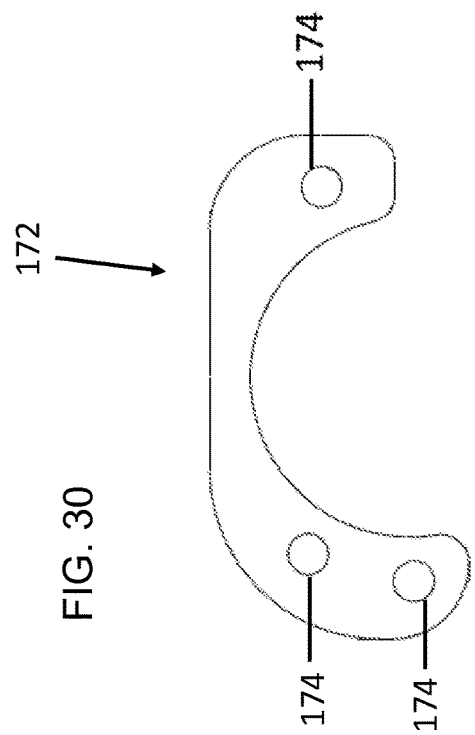
FIG. 30 is a front elevational view of the spacer of FIG. 29.
Figure 29:
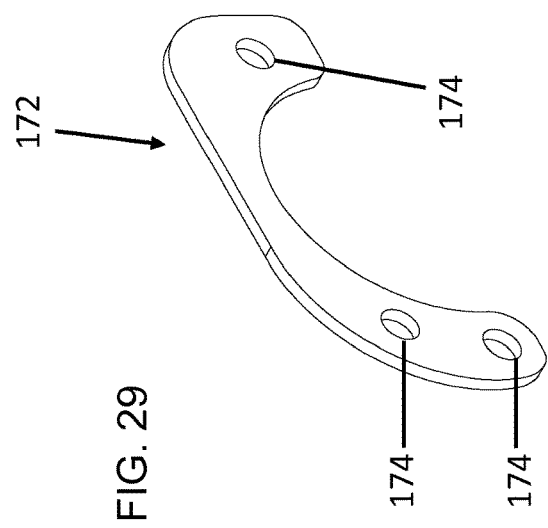
FIG. 29 is a perspective view of a spacer of the steering knuckle of FIG. 14.

On account of the differences in the configurations of the generally vertical faces of the upper yolk arms, the steering assembly 100 of FIGS. 14 and 15 may be provided with a differently configured spindle 118, as shown in FIGS. 26-28. In the illustrated embodiment, the inner end 152 (i.e., the end that is positioned closer to the center of the vehicle when the steering assembly 100 is assembled) includes a notch or cutout 154. In one exemplary embodiment, the inner end 152 of the spindle 118 has a diameter of approximately 5 inches, with the lower 1.75 inches of the inner end 152 being omitted or removed to define the cutout 154, and the cutout 154 having a length of approximately 2 inches (in a direction extending between the ends of the spindle 118). Hence, as best shown in FIG. 27, the inner end 152 of the spindle 118 is generally arcuate, rather than being annular. While the illustrated embodiment may be preferred, it should be understood that the notch or cutout 154 at the inner end 152 of the spindle 118 may be variously configured without departing from the scope of the present disclosure.

The cutout 154 of the spindle 118 allows for a complete circular weld to secure the spindle 118 to the spindle bore 116 of the knuckle body 106. When the spindle 118 has been properly positioned within the spindle bore 116, as shown in FIG. 15, the cutout 154 defines a gap between the inner end 152 of the spindle 118 and the lower yolk arm 112 of the knuckle body 106, which provides sufficient space to access and place a weld 156 between the lower yolk arm 112 and the spindle 118. The weld 156 may continue in a complete circle around the perimeter of the spindle 118 to secure the spindle 118 to the spindle bore 116. Preferably, the spindle 118 is secured to the spindle bore 116 by this circular weld 156 prior to securing the upper yolk arm 108 to the knuckle body 106. A complete circular weld 158 may also be employed between the spindle 118 and the spindle bore 116 on the opposite side or outer surface of the generally vertical face 110 of the knuckle body 106. This outer or second circular weld 158 may be applied either prior to or after securing the upper yolk arm 108 to the knuckle body 106.

In the illustrated embodiment, the spindle bore 116 includes a chamfer or angled formation 160 (FIGS. 19 and 20) along at least a portion of its perimeter. The chamfer 160, if provided, provides a seat for the circular weld 156, thereby allowing for the weld 156 to be built up and creating an improved connection between the spindle bore 116 and the spindle 118. Preferably, as shown in FIGS. 19 and 20, a second chamfer 162 is present along at least a portion of the perimeter of the opposite surface of the spindle bore 116, which provides a seat for the second circular weld 158. In an exemplary embodiment, the chamfers 160 and 162 are substantially identical and formed with an angle A of approximately 35°, but the chamfers 160 and 162 may be differently configured from each other and from the illustrated embodiment.

As described above, it may be advantageous to secure the spindle 118 to the knuckle body 106 prior to incorporating the upper yolk arm 108 into the steering assembly 100. In one embodiment, after the spindle 118 has been secured to the knuckle body 106, the upper yolk arm 108 may be advanced or slid along the spindle 118, with the spindle 118 positioned within the arcuate formation 150. When the upper yolk arm 108 has been sufficiently advanced along the spindle 118, it may be secured to the knuckle body 106 and/or the spindle 118. In the illustrated embodiment, the upper yolk arm 108 is secured to the knuckle body 106 with mechanical fasteners 122, as well as being secured to the spindle 118 with an arcuate weld 164 (FIG. 15). As shown in FIGS. 24 and 25, at least a portion of the arcuate formation 150 may include a chamfer 166 (formed at an angle B of approximately 37° in one example) to provide a seat for the actuate weld 164 between the arcuate formation 150 and the spindle 118. In other embodiments, only mechanical fasteners or only a weld or some other fixation means may be used to secure the upper yolk arm within the steering assembly.

Turning now to the generally horizontal face 140 of the upper yolk arm 108, it may be provided with an upper steering pivot axis bore 168 extending through it. Similar to the lower steering pivot axis bore 130 of the lower yolk arm 112, the upper steering pivot axis bore 168 is configured to receive a boss 170 (FIG. 32) which, in turn, receives a top end of a kingpin (not illustrated). As described above with respect to the lower steering pivot axis bore 130, the upper steering pivot axis bore 168 may be offset with respect to the location of the spindle 118 when the steering assembly 100 has been assembled, such as in the illustrated embodiment, in which the upper steering pivot axis bore 168 is oriented to be ahead or forward of the spindle 118 to provide a leading kingpin knuckle design. Alternatively, the upper steering pivot axis bore 168 may be oriented to be aligned with (i.e., not leading or trailing) the spindle 118 when the steering assembly 100 has been assembled.

The steering assembly 100 may include additional components without departing from the scope of the present disclosure. For example, in the illustrated embodiment, the steering assembly 100 includes a spacer 172 positioned between the knuckle body 106 and the upper yolk arm 108. The spacer 172 is visible in FIGS. 15 and 33-35, and one exemplary configuration of the spacer 172 is shown in greater detail in FIGS. 29-30. In the illustrated embodiment, the spacer 172 is generally arcuate and substantially planar, with a shape that is configured to fit between the spindle 118 (at a lower edge of the spacer 172) and the outer perimeter of the generally vertical face 110 of the knuckle body 106 (at an upper edge of the spacer 172), but the spacer 172 may be otherwise configured without departing from the scope of the present disclosure.

In assembling a steering assembly 100 including a spacer 172, the spacer 172 may be placed against the generally vertical face 110 of the knuckle body 106 after welding the spindle 118 to the spindle bore 116. With the spacer 172 positioned adjacent to the generally vertical face 110 of the knuckle body 106, the upper yolk arm 108 may be advanced along the spindle 108 to sandwiching the spacer 172 between the generally vertical faces 110 and 138 of the knuckle body 106 and the upper yolk arm 108. The spacer 172 preferably has a thickness that is configured to enforce a particular separation between the generally vertical faces 110 and 138 of the knuckle body 106 and the upper yolk arm 108, which ensures proper positioning of selected components of the brake assembly 102. In the illustrated embodiment, the spacer 172 includes a plurality of bores 174 configured to receive mechanical fasteners 122 that secure the knuckle body 106, the spacer 172, and the upper yolk arm 108 together. In other embodiments, the spacer 172 may be secured within the steering assembly 100 by any other suitable means, such as welding or an interference fit.

Figure 31:
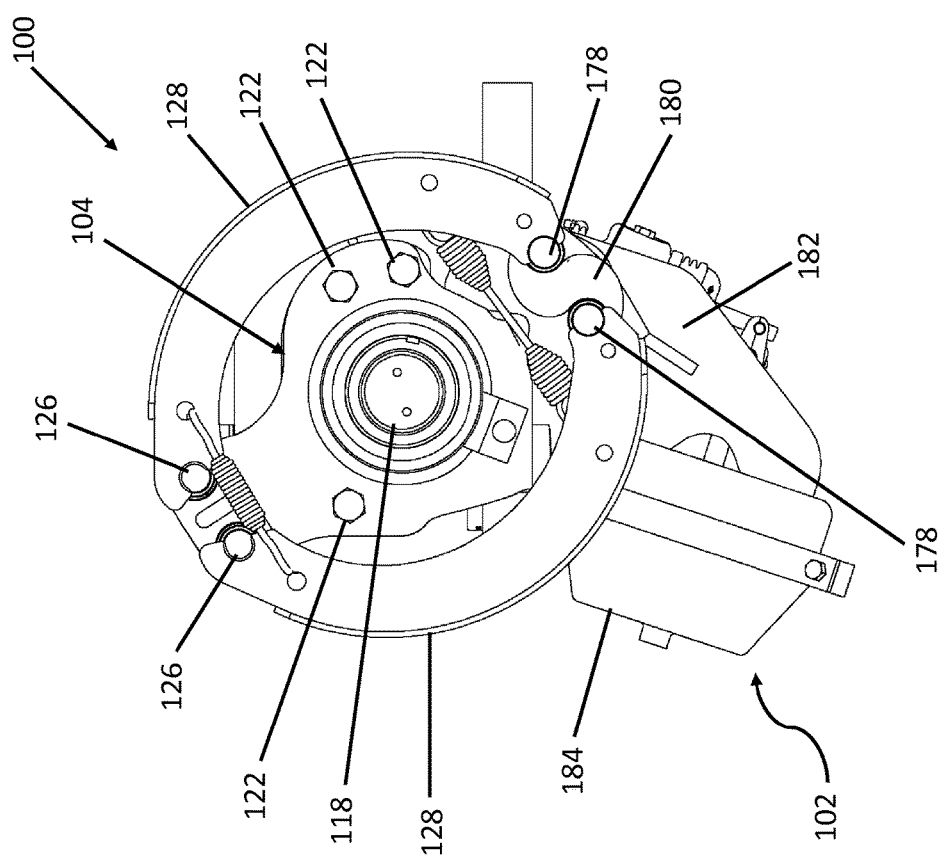
FIG. 31 is a front elevational view of the steering assembly of FIG. 14, incorporating selected components of a brake assembly.
Figure 32:
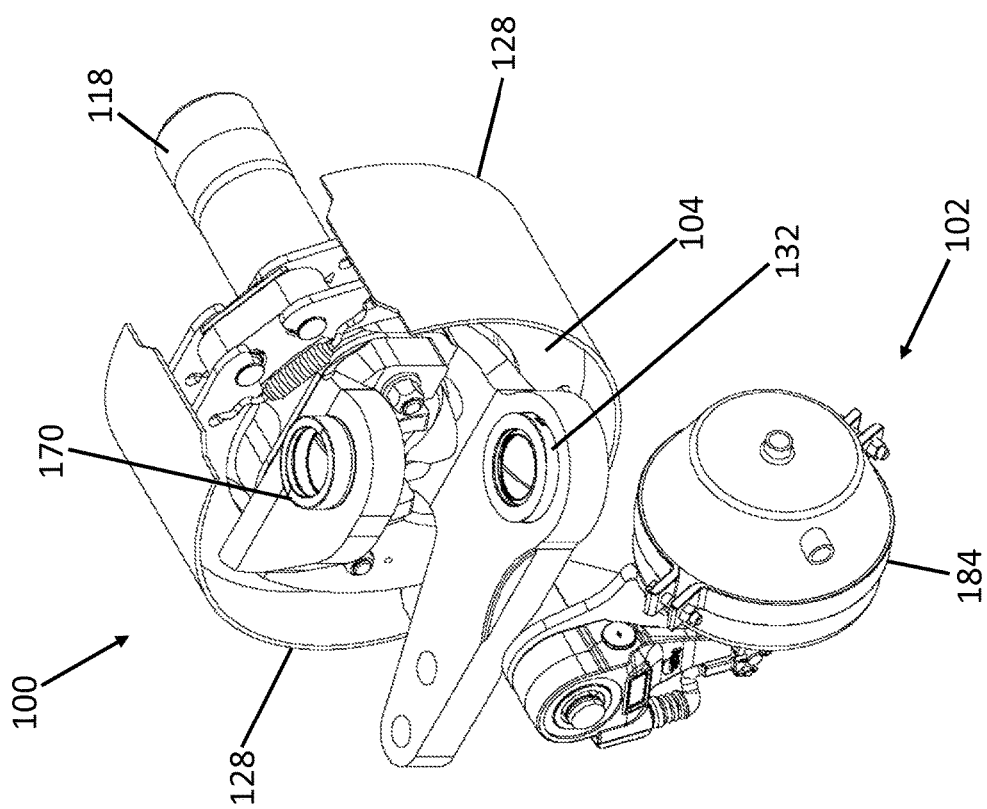
FIG. 32 is a rear perspective view of the steering assembly of FIG. 31.
Figure 33:
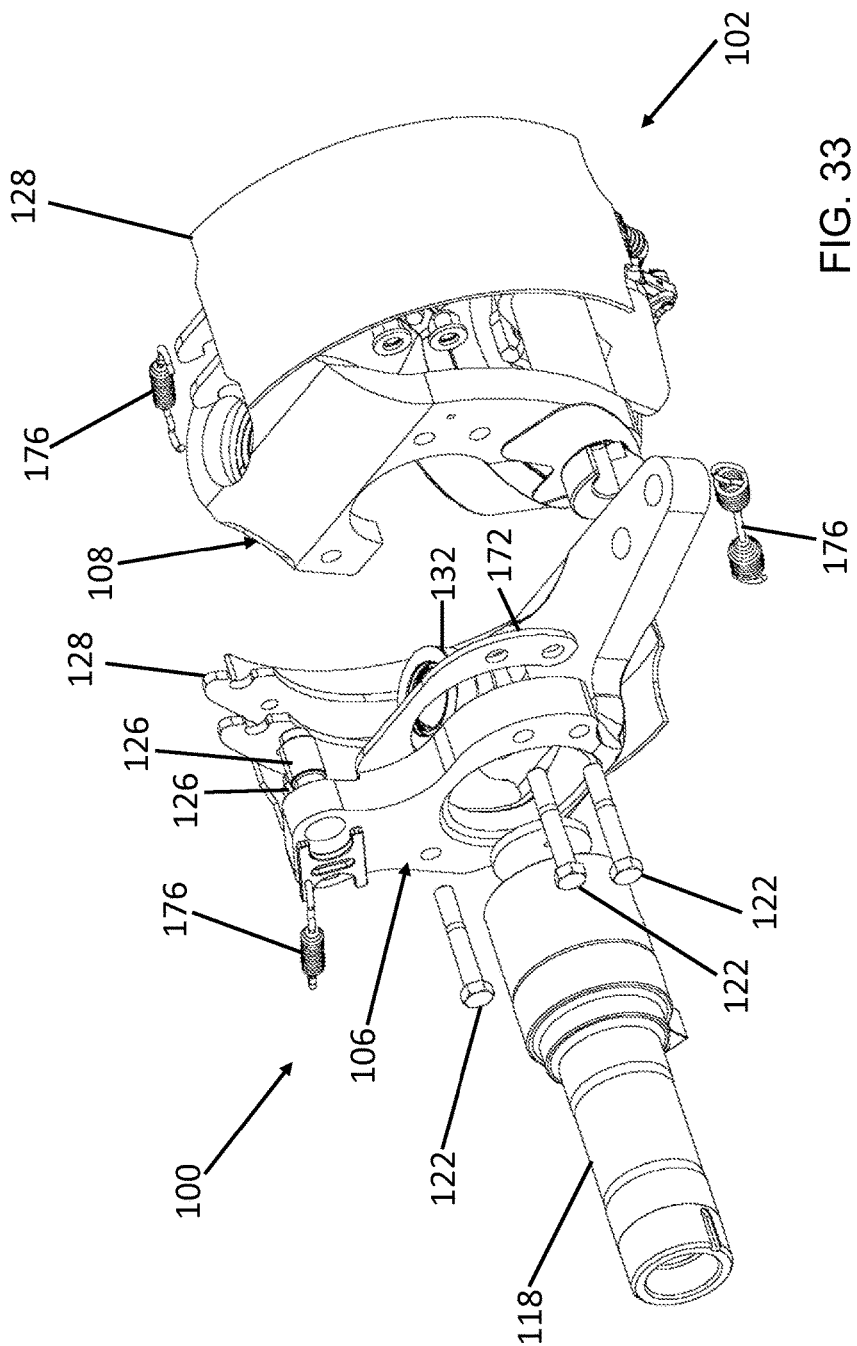
FIG. 33 is a front exploded view of the steering assembly of FIG. 31.
Figure 34:
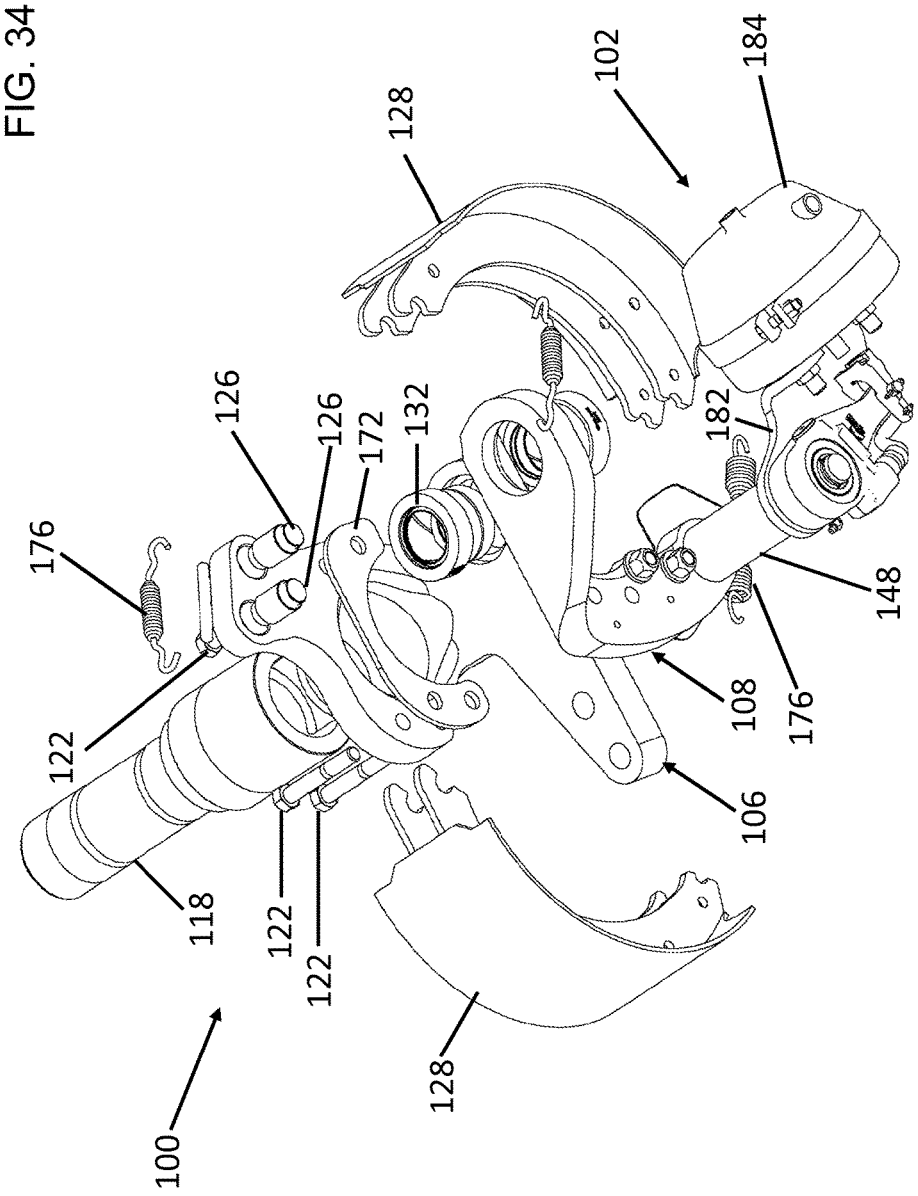
FIG. 34 is a rear exploded view of the steering assembly of FIG. 31.
Figure 35:
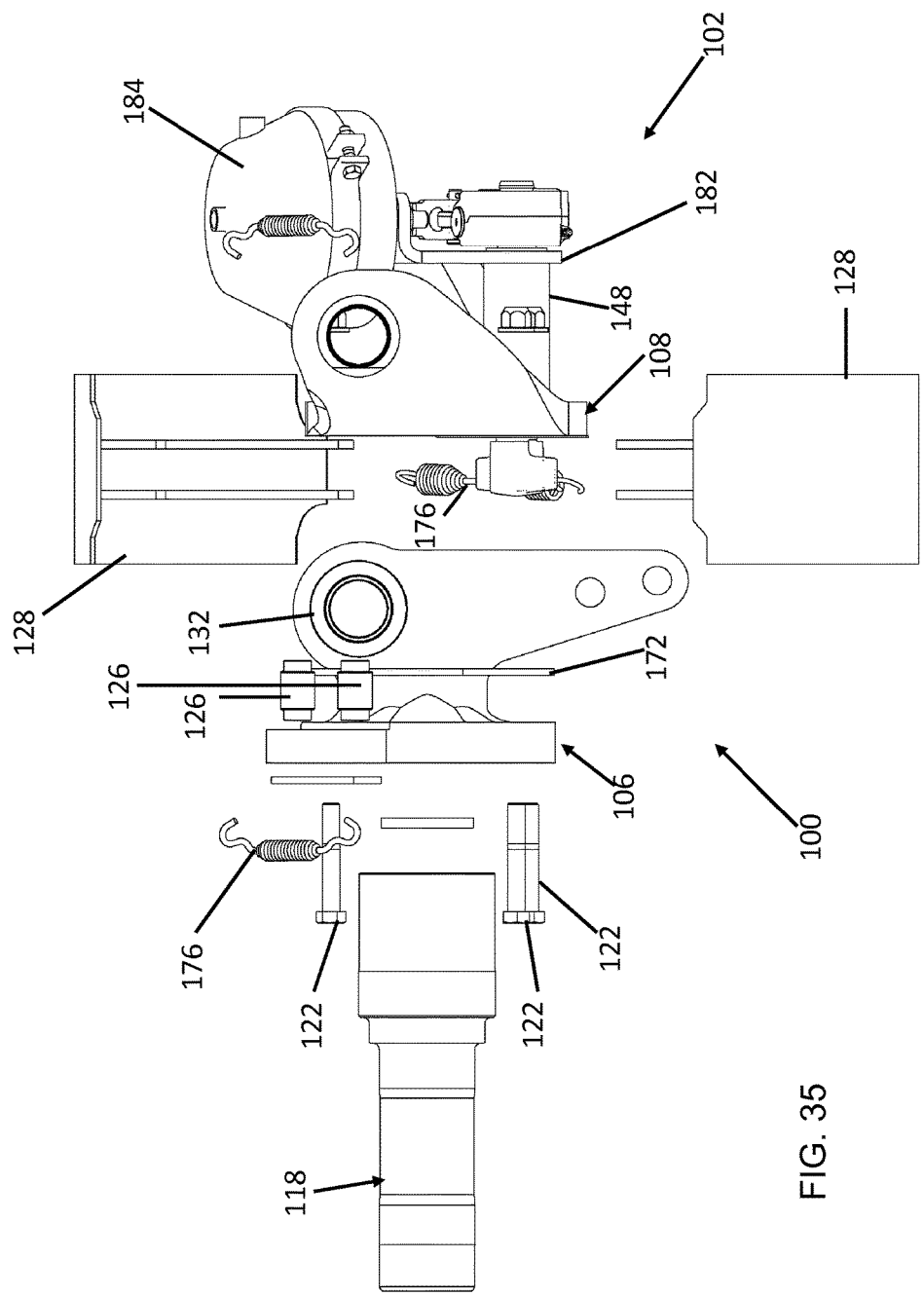
FIG. 35 is a top exploded view of the steering assembly of FIG. 31.

FIGS. 31-35 show the fabricated steering knuckle 104 of FIGS. 14 and 15 with additional components of a brake assembly 102. In the illustrated embodiment, the brake assembly 102 includes a pair of brake shoes 128 pivotally associated with the generally vertical face 110 of the knuckle body 106 via the anchor pins 126. The portion of the generally vertical face 110 of the knuckle body 106 directly adjacent to the bores 124 receiving the anchor pins 126 may be relatively thin compared to the remainder of the knuckle body 106 (FIGS. 16 and 19), which may be advantageous for properly positioning selected components of the brake assembly 102, while allowing the ends of the anchor pins 126 to extend outside of the knuckle body 106 to engage the brake shoes 128. Engaging each end of the anchor pins 126 with the brake shoes 128 places the anchor pins 126 in dual shear. At both ends of the brake shoes 128, one or more springs 176 bias the brake shoes 128 toward each other. Biasing the brake shoes 128 toward each other at the end opposite the anchor pins 126 brings cam followers 178 of the brake shoes 128 into contact with an S-cam 180 (FIG. 31). The S-cam 180 is connected to an end of a camshaft 148 received by the camshaft bore 146 of the upper yolk arm 108. A lever 182 is rigidly secured at or adjacent to the other end of the camshaft 148 for association with a brake chamber 184. The functions of the brake chamber 184 and the other components of the brake assembly 102 are described above with regard to the embodiment of FIGS. 1-13.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A steering knuckle for use in association with a vehicle steering assembly, comprising:
   a knuckle body having a generally vertical face; and
   an upper yolk arm having a generally vertical face connected to the generally vertical face of the knuckle body and including a camshaft bore extending therethrough and configured to receive a camshaft of a brake assembly.

2. The steering knuckle of claim 1, wherein the generally vertical face of the knuckle body defines a spindle bore configured to receive a spindle.

3. The steering knuckle of claim 2, wherein the upper yolk arm further comprises a generally horizontal face having an upper steering pivot axis bore extending therethrough and offset from the spindle bore.

4. The steering knuckle of any of claim 2, wherein the knuckle body further comprises a lower yolk arm having a lower steering pivot axis bore extending therethrough and offset from the spindle bore.

5. The steering knuckle of any of claim 2, wherein the generally vertical face of the upper yolk arm overlays the spindle bore.

6. The steering knuckle of claim 5, wherein the generally vertical face of the upper yolk arm includes a counterbore generally aligned with the spindle bore.

7. The steering knuckle of any of claim 2, wherein the spindle bore is offset from the longitudinal center of the generally vertical face of the knuckle body.

8. The steering knuckle of claim 1, wherein the portion of the generally vertical face of the upper yolk arm connected to the generally vertical face of the knuckle body has a different thickness than the portion of the generally vertical face of the upper yolk arm directly adjacent to the camshaft bore.

9. The steering knuckle of claim 8, wherein the thickness of the portion of the generally vertical face of the upper yolk arm connected to the generally vertical face of the knuckle body has a greater thickness than the portion of the generally vertical face of the upper yolk arm directly adjacent to the camshaft bore.

10. The steering knuckle of any of claim 8, wherein the upper yolk arm has a minimum thickness directly adjacent to the camshaft bore.

11. A vehicle steering assembly, comprising:
    a knuckle body having a generally vertical face defining a spindle bore;
    an upper yolk arm having a generally vertical face connected to the generally vertical face of the knuckle body; and a spindle received by the spindle bore, wherein the spindle is secured to the spindle bore by at least one circular weld along a perimeter of the spindle.

12. The vehicle steering assembly of claim 11, wherein
the spindle bore includes a chamfer, and
the at least one circular weld is at least partially positioned within the chamfer.

13. The vehicle steering assembly of any of claim 11, wherein
the knuckle body includes a generally horizontal face extending from a lower end of the generally vertical face of the knuckle body,
an inner end of the spindle defines a cutout which defines a gap between the inner end of the spindle and the generally horizontal face of the knuckle body, and
the at least one circular weld is at least partially positioned within the gap.

14. The vehicle steering assembly of any of claim 11, further comprising a second circular weld between the spindle and the spindle bore.

15. The vehicle steering assembly of claim 14, wherein
the spindle bore includes a second chamfer, and
the second circular weld is at least partially positioned within the second chamfer.

16. The vehicle steering assembly of any of claim 11, wherein the generally vertical face of the upper yolk arm includes a lower edge having an arcuate formation positioned adjacent to the spindle.

17. The vehicle steering assembly of claim 16, wherein the arcuate formation of the generally vertical face of the upper yolk arm is secured to the spindle by an arcuate weld.

18. The vehicle steering assembly of claim 17, wherein
the arcuate formation includes a chamfer, and
the arcuate weld is at least partially positioned within the chamfer of the arcuate formation.

19. A method of manufacturing a vehicle steering assembly comprising:
providing a knuckle body having a generally vertical face defining a spindle bore;
positioning a spindle within the spindle bore;
securing the spindle to the spindle bore with at least one circular weld along a perimeter of the spindle; and
connecting a generally vertical face of an upper yolk arm to the generally vertical face of the knuckle body.

20. The method of claim 19, wherein said securing the spindle to the spindle bore includes securing the spindle to the spindle bore with two circular welds.

21. The method of any of claim 19, further comprising securing an arcuate formation of the generally vertical face of the upper yolk arm to the spindle.

22. The method of claim 21, wherein said securing an arcuate formation of the generally vertical face of the upper yolk arm to the spindle includes applying an arcuate weld between the arcuate formation and the spindle.

* * * * *